(12) United States Patent
Fukano et al.

(10) Patent No.: US 9,328,829 B2
(45) Date of Patent: May 3, 2016

(54) TWO-WAY VALVE

(71) Applicant: SMC KABUSHIKI KAISHA, Chiyoda-ku (JP)

(72) Inventors: Yoshihiro Fukano, Moriya (JP); Tadashi Uchino, Moriya (JP); Yasunori Suzuki, Joso (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 13/901,052

(22) Filed: May 23, 2013

(65) Prior Publication Data

US 2013/0341550 A1    Dec. 26, 2013

(30) Foreign Application Priority Data

Jun. 22, 2012  (JP) .................................. 2012-140913

(51) Int. Cl.
*F16K 7/12* (2006.01)
*F16K 31/122* (2006.01)

(52) U.S. Cl.
CPC . *F16K 7/12* (2013.01); *F16K 7/126* (2013.01); *F16K 31/1221* (2013.01)

(58) Field of Classification Search
CPC ... F16K 7/12; F16K 37/0008; F16K 37/0058; F16K 31/1221
USPC .................. 251/63.5, 331, 61.5, 62
See application file for complete search history.

(56) References Cited

U.S. PATENT DOCUMENTS

| | | | | |
|---|---|---|---|---|
| 3,148,861 A | * | 9/1964 | McFarland, Jr. | ............. 251/331 |
| 3,154,286 A | * | 10/1964 | McFarland, Jr. | ............. 251/331 |
| 5,520,213 A | * | 5/1996 | Muller | ........................... 137/375 |
| 5,779,224 A | * | 7/1998 | Fukano et al. | ................. 251/331 |
| 6,003,835 A | * | 12/1999 | Moller | ...................... F16K 7/17 251/331 |
| 6,095,484 A | * | 8/2000 | Frenkel | ........................ 251/61.1 |
| 6,241,213 B1 | * | 6/2001 | Butler | ........................... 251/264 |

(Continued)

FOREIGN PATENT DOCUMENTS

GB    2040407 A  *  8/1980
JP    32-013371      10/1957

(Continued)

OTHER PUBLICATIONS

Office Action issued Apr. 29, 2014 in Korean Patent Application No. 10-2013-0064042 (with English translation of pertinent portion).
Office Action issued in Taiwanese Patent Application No. 102120868 on Jan. 26, 2015 (w/ English translation).

*Primary Examiner* — John K Fristoe, Jr.
*Assistant Examiner* — Andrew J Rost
(74) *Attorney, Agent, or Firm* — Oblon, McClelland, Maier & Neustadt, L.L.P.

(57) ABSTRACT

A two-way valve includes a valve body made of a resilient member and connected to a lower end of a shaft. The valve body is made up from a main body portion having an axial member connected to the shaft, and a thin film skirt portion formed on an outer circumferential side of the main body portion. An outer edge of the skirt portion is sandwiched and gripped between a small diameter part of a housing and a connector of a body. Further, lips that project in a downward direction are formed in a central portion of the main body portion. The lips are seated on a top portion of a partition wall in the body, so that the two-way valve is placed in a valve-closed state.

8 Claims, 3 Drawing Sheets

(56) References Cited

U.S. PATENT DOCUMENTS 6,481,459 B2 * 11/2002 Fukano et al. ............. 137/554
6,481,460 B2 * 11/2002 Fukano et al. ............. 137/554
6,508,266 B2 * 1/2003 Iritani et al. ............. 137/312

FOREIGN PATENT DOCUMENTS

| JP | 7-45908 | 5/1995 |
| JP | 10-184947 | 7/1998 |
| KR | 20-0453686 Y1 | 5/2011 |

* cited by examiner

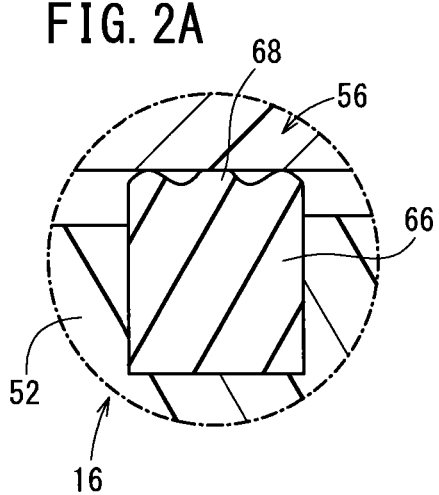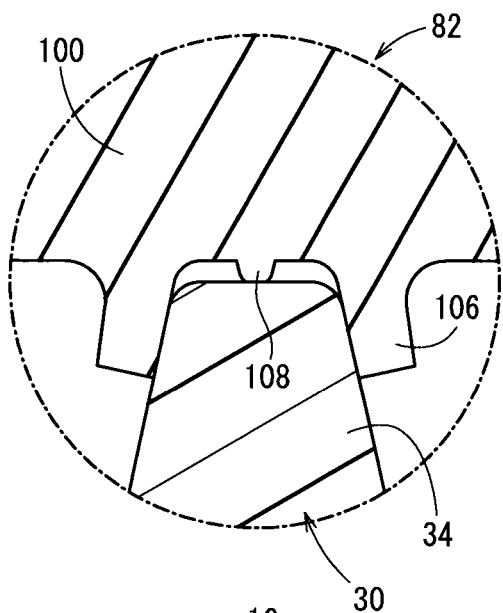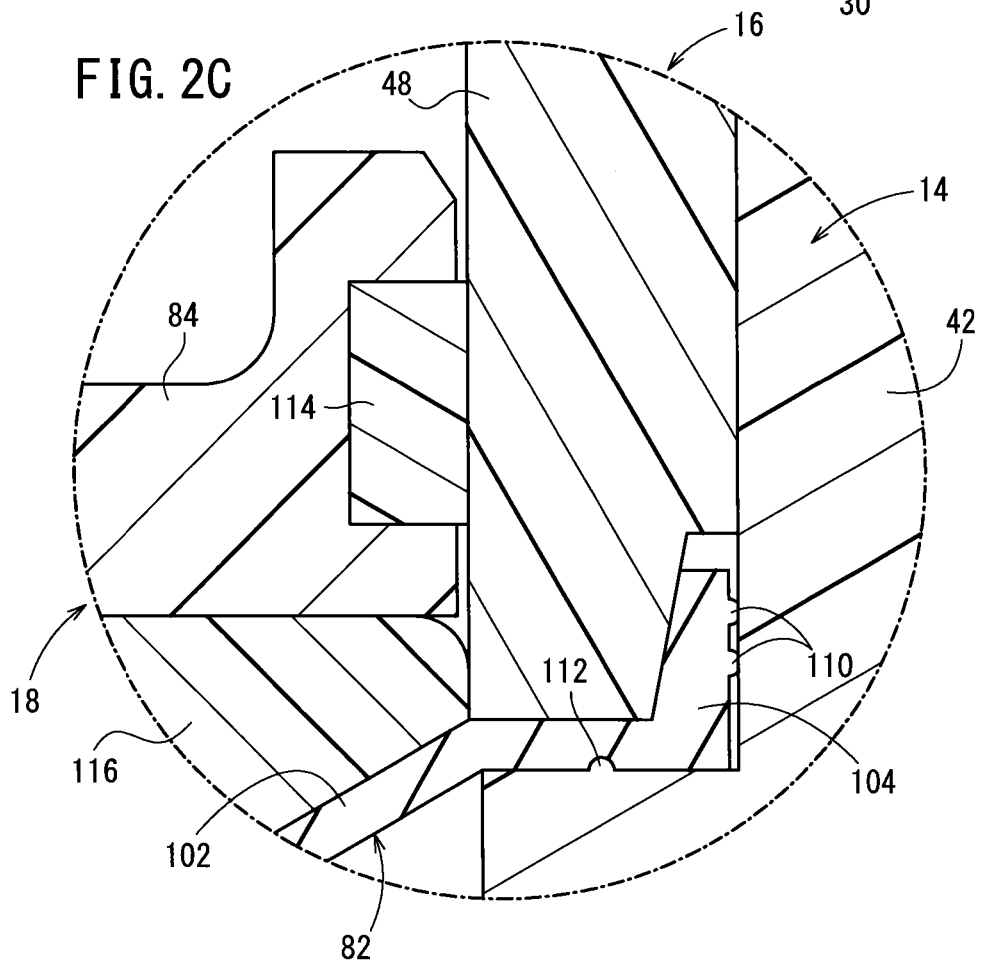

TWO-WAY VALVE

CROSS-REFERENCE TO RELATED APPLICATION

This application is based upon and claims the benefit of priority from Japanese Patent Application No. 2012-140913 filed on Jun. 22, 2012, the contents of which are incorporated herein by reference.

BACKGROUND OF THE INVENTION

1. Field of the Invention

The present invention relates to a two-way valve that switches a flow through state of a fluid by movement of a valve body.

2. Description of the Related Art

Heretofore, a two-way valve has been known in which a flow passage through which a pressure fluid flows is formed in a body, and by seating and unseating of a valve body with respect to a seat provided in the flow passage, the flow through state of the pressure fluid in the flow passage can be switched.

A two-way valve of this type, for example, is disclosed in Japanese Patent Publication No. 07-045908, in which a cylinder and a cylinder cover are disposed on an upper part of a main body having a flow passage therein, and an outer edge of a diaphragm constituting a diaphragm valve is sandwiched and gripped between the main body and the cylinder. Additionally, a pin is inserted and connected to the center of the upper surface of the diaphragm, an upper part of the pin is connected to a compressor, and the compressor is connected to a lower end of a spindle through a compressor suspender, whereby upon rotation of the spindle, the diaphragm is displaced vertically in a flexing manner.

Further, a two-way valve disclosed in Japanese Laid-Open Patent Publication No. 10-184947 is equipped with a main body including a flow passage therein, a bonnet connected to an upper part of the main body, and a piston disposed displaceably in a cylinder chamber of the bonnet. A compressor is connected to a lower end of a spindle, which is connected to the piston, and a diaphragm is installed on a lower surface of the compressor. In addition, in the event that the diaphragm valve including a diaphragm is to be opened, the piston is raised by a spring disposed in the cylinder chamber, and the spindle and the diaphragm are raised together therewith. Conversely, in the case that the diaphragm is to be placed in a valve-closed state, the piston is pressed downward by supplying a pressure fluid to the cylinder chamber, the diaphragm is lowered, and the diaphragm valve is seated with respect to a valve seat in the main body.

SUMMARY OF THE INVENTION

However, with the two-way valve of the aforementioned Japanese Laid-Open Patent Publication No. 10-184947, the valve seat of the main body on which the diaphragm that makes up the diaphragm valve is seated is formed with a flat planar shape, and therefore, when the valve is closed, the contact area between the valve seat and the diaphragm is required to be large, along with a large load being required when the diaphragm is seated on the valve seat. Consequently, the pressure of the pressure fluid which is supplied to the cylinder chamber must be high, and a need arises for the resilient force of the spring, which acts in opposition to the pressure of the pressure fluid, to be large as well. As a result, the cost for the spring increases, and ease of assembly for assembling such a high elastic force spring is adversely affected.

Further, in the case of a structure in which an outer edge of the diaphragm is sandwiched and gripped between the cylinder and the main body, for example, in the event that the clamping force of bolts that fasten the cylinder and the main body is lowered, since the sealing property of the seal formed by the outer edge between the cylinder and the main body is lowered, it is difficult to provide an increased service life for two-way valves that make use of diaphragms therein, demands for which have been increasing in recent years.

A general object of the present invention is to provide a two-way valve capable of having an increased service life, while lowering manufacturing costs and man-hours required for assembly of the two-way valve.

The present invention is characterized by:

a body including a pair of first and second ports through which a pressure fluid is supplied and discharged, flow passages connected to the first port and the second port, and a partition member formed midway in the flow passages and separating the first port and the second port;

a diaphragm valve having a main body portion disposed displaceably in the body and which is seated on a valve seat formed on an end of the partition member, and a skirt portion formed as a thin film on an outer circumferential side of the main body portion and which is retained by the body, wherein communication between the flow passages is interrupted by seating of the main body portion on the valve seat; and a protective body made of a resilient member, which alleviates a load applied to the skirt portion by being disposed in intimate contact with the skirt portion, wherein the diaphragm valve is connected to one end of a shaft disposed displaceably in an axial direction, and a spring that urges the diaphragm valve toward the valve seat is disposed on a piston connected to another end of the shaft, and the main body portion includes, on a bottom portion thereof facing the valve seat, lips that cover a portion of the partition member when seated on the valve seat.

According to the present invention, in the two-way valve, the diaphragm valve is disposed displaceably in the interior of the body having the first and second ports, and the diaphragm valve includes the main body portion, which is seated on the valve seat formed on an end of the partition member of the body, and the skirt portion, which is formed as a thin film on an outer circumferential side of the main body portion and which is retained by the body. In addition, when the diaphragm valve is seated with respect to the valve seat under a displacement action of the piston, which is connected to the diaphragm valve via the shaft, the lips formed on the bottom of the main body portion are seated so as to cover the portion of the partition member. Further, the piston is urged toward the side of the valve seat by an elastic force of the spring, whereby the diaphragm valve is pressed toward the side of the valve seat and is seated thereon.

Accordingly, in a valve-closed state in which the diaphragm valve is seated on the valve seat and communication between the first port and the second port is blocked, the lips are seated so as to cover the portion of the partition wall. Thus, compared to a conventional two-way valve, in which sealing is performed by surface contact between the diaphragm valve and the valve seat, sealing can be performed with a small load at the time of valve closing, and sealing performance can be significantly improved.

As a result, the pressing force that presses on the diaphragm at the time of valve closing, and more specifically, the elastic force of the spring can be suppressed, and a smallsized spring which is smaller in scale can be used. Therefore, manufacturing costs can be reduced, and compared to the case of assembling a spring with a large elastic force, man-hours required for assembly of the two-way valve can be reduced. Further, sealing performance can be enhanced, along with increasing the service life of the two-way valve.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is an enlarged cross sectional view showing a principal part A in the two-way valve of FIG. 1;

FIG. 2B is an enlarged cross sectional view showing a principal part B in the two-way valve of FIG. 1;

FIG. 2C is an enlarged cross sectional view showing a principal part C in the two-way valve of FIG. 1.

DESCRIPTION OF THE PREFERRED EMBODIMENTS

Figure 1:
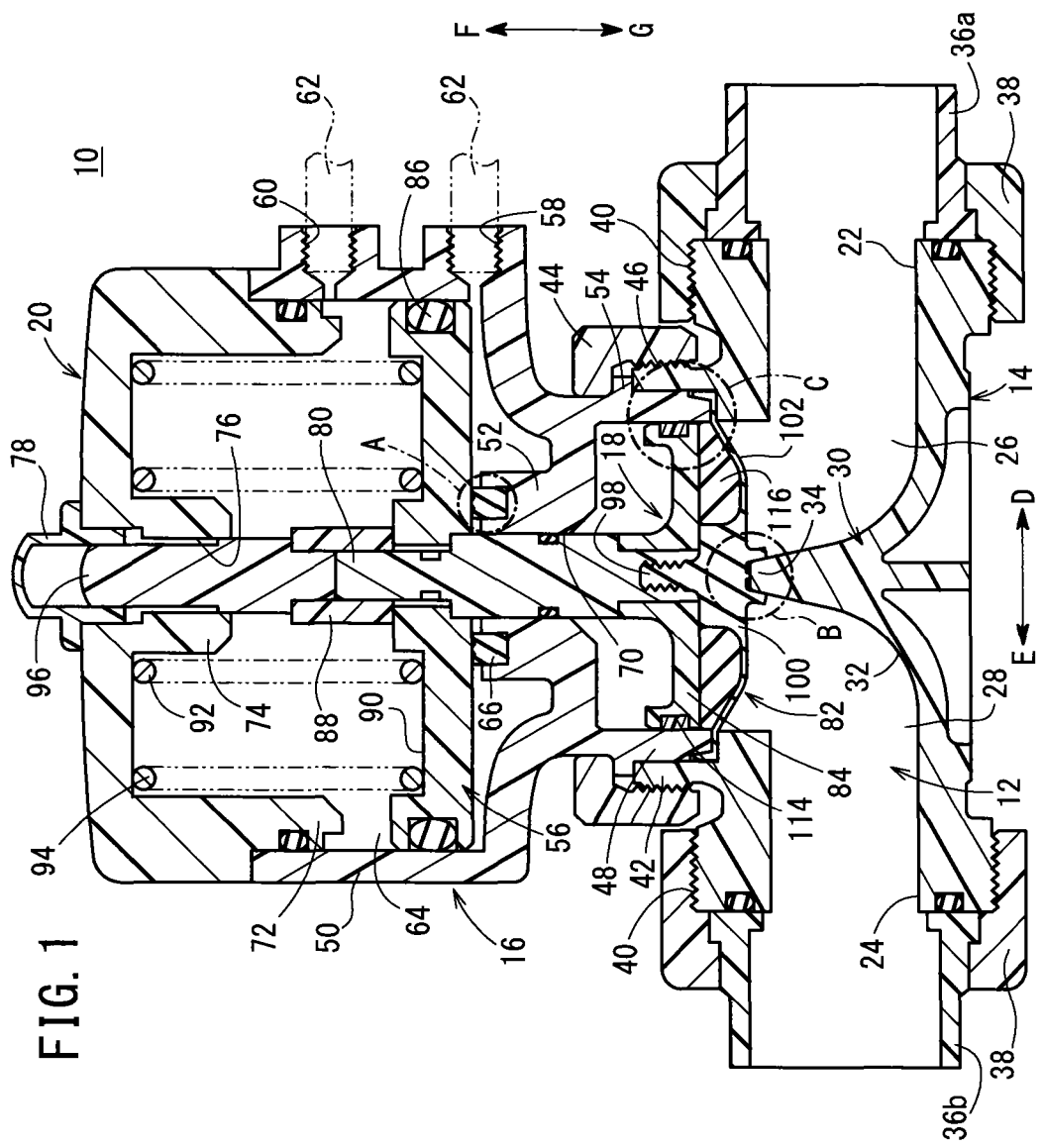
FIG. 1 is an overall cross sectional view of a two-way valve according to the present invention.

As shown in FIG. 1, the two-way valve 10 includes a body 14 having a flow passage 12 therein through which a pressure fluid flows, a housing 16 connected to a central portion of the body 14, a valve mechanism 18 disposed in the interior of the housing 16, and a bonnet 20 that closes an upper end of the housing 16.

The body 14 is formed from a resin material, for example, and includes a first port 22 formed on one end side thereof (in the direction of the arrow D) to which a pressure fluid is supplied, a second port 24 formed on another end side thereof (in the direction of the arrow E) through which the pressure fluid is discharged, a first flow passage 26 connected to the first port 22, and a second flow passage 28 connected to the second port 24.

The first and second flow passages 26, 28 are formed mutually along a straight line with substantially the same passage diameter. At a boundary region between the first and second flow passages 26, 28, a partition wall 30 is formed substantially perpendicular with respect to the direction in which the first and second flow passages 26, 28 extend (in the direction of arrows D and E).

The partition wall 30 is made up from inclined surfaces 32, which are formed with arcuate shapes in cross section and extend from a bottom surface of the first and second flow passages 26, 28 gradually toward the side of the housing 16 (in the direction of the arrow F), and a top portion 34, which is formed on the distal end of the inclined surfaces 32. Additionally, the top portion 34 is formed to be greater in height than the upper sides of the inner circumferential surfaces of the first and second flow passages 26, 28, and the top portion 34 functions as a valve seat on which a later-described valve body 82 is seated.

Stated otherwise, the partition wall 30 is formed in the shape of a mountain in cross section, having inclined surfaces 32, which are arcuate in cross section and extend upwardly (in the direction of the arrow F) toward the top portion 34 of the partition wall 30.

The end of the top portion 34 includes a distal end surface that lies substantially parallel to the direction of extension of the first and second flow passages 26, 28 in cross section, and the top portion 34 is formed with a tapered shape in cross section, which is gradually reduced in width from the inclined surfaces 32 toward the distal end surface.

Further, on one end and another end of the body 14 facing toward the first port 22 and the second port 24, respective cylindrical connecting plugs 36a, 36b are formed. In a condition in which the connecting plugs 36a, 36b abut against the one end and the other end of the body 14, fastening nuts 38 are inserted over the outer circumferential sides thereof, and by screw-engagement of the fastening nuts 38 with first screw threads 40, which are formed on the outer circumferential surface of the body 14, the connecting plugs 36a, 36b are fastened with respect to the one end and the other end of the body 14. Non-illustrated pipes through which the pressure fluid is supplied and discharged are connected respectively to the connecting plugs 36a, 36b.

On the other hand, in a substantially central portion of the body 14, a connector 42 is formed, which opens upwardly (in the direction of the arrow F) in a perpendicular direction with respect to the direction of extension (the direction of arrows D and E) of the first and second flow passages 26, 28. Further, a later-described small diameter part 48 of the housing 16 is inserted into the interior of the opened connector 42. Second screw threads 46, with which a ring shaped lock nut 44 is screw-engaged, are formed on an outer circumferential surface of the connector 42.

The housing 16 is formed, for example, from a resin material, and includes a small diameter part 48 connected to the connector 42 of the body 14, a large diameter part 50 that is expanded in diameter with respect to the small diameter part 48, and a shaft support member 52, which is formed at a boundary region between the large diameter part 50 and the small diameter part 48, and which displaceably supports the shaft 80 of the later-described valve mechanism 18. The small diameter part 48 and the large diameter part 50 open respectively in the axial direction (the direction of arrows F and G) and are formed coaxially on the same axis.

In addition, the small diameter part 48 is inserted in a downward direction (in the direction of the arrow G) into the interior of the connector 42. In a state in which a flange 54 formed on the outer circumferential surface of the small diameter part 48 abuts against an end of the connector 42, the lock nut 44, which is disposed on the outer circumferential side of the small diameter part 48, is screw-engaged with respect to the second screw threads 46. Owing thereto, the small diameter part 48 of the housing 16 is connected with respect to the connector 42 of the body 14.

The large diameter part 50 is formed in a cylindrical shape and opens upwardly (in the direction of the arrow F). A later-described piston 56 of the valve mechanism 18 is accommodated in the interior of the large diameter part 50. A supply port 58 and a discharge port 60, which open to the exterior, are formed on an outer circumferential wall of the large diameter part 50.

The supply port 58 and the discharge port 60 are separated mutually by a predetermined distance and are disposed so that the supply port 58 is located on the side of the body 14 (in the direction of the arrow G), and the discharge port 60 is located on the side of the bonnet 20 (in the direction of the arrow F). Further, tubes 62 are connected respectively to the supply port 58 and the discharge port 60, and communicate respectively with the piston chamber 64 formed in the interior of the large diameter part 50. In addition, a non-illustrated pressure fluid supply source is connected to the supply port 58, whereas the discharge port 60 is open to atmosphere.

The shaft support member 52 is formed coaxially with the large diameter part 50 and the small diameter part 48. As shown in FIG. 2A, a piston damper 66 is installed via an annular groove on an end face on the side of the large diameter part 50 (in the direction of the arrow F). As shown in FIGS. 1 and 2A, the piston damper 66 is formed in a ring shape from a resilient material, for example, such as rubber or the like. The piston damper 66 projects at a predetermined height from the annular groove toward the side of the bonnet 20 (in the direction of the arrow F), and a projection 68, which projects with a semicircular shape in cross section, is formed on an upper surface of the piston damper 66 (see FIG. 2A).

Further, a shaft hole 70 is formed, which penetrates in the axial direction (the direction of arrows F and G) through the center of the shaft support member 52. The shaft hole 70 penetrates from the large diameter part 50 to the small diameter part 48.

The bonnet 20, which includes a fitting 72 formed in a bottomed cylindrical shape, for example, from a resin material, and which is inserted into the large diameter part 50 in the housing 16, and an indicator support member 74 that displaceably supports a later-described indicator 96.

The fitting 72 projects a predetermined length downward (in the direction of the arrow G) in the interior of the large diameter part 50 in the housing 16. When the piston 56 disposed in the piston chamber 64 is displaced upward, a lower end of the fitting 72 serves as a stopper for regulating an upper end position of the piston 56. In addition, by insertion of the fitting 72 into the interior of the large diameter part 50, the piston chamber 64 is formed by the bonnet 20 and the large diameter part 50 of the housing 16.

The indicator support member 74 is formed substantially in the center of the bonnet 20, with an indicator support hole 76, in which the later-described indicator 96 is displaceably supported, penetrating centrally through the indicator support member 74 along the axial direction (the direction of arrows F and G). In addition, a cap 78, which is formed in a bottomed cylindrical shape from a transparent or semitransparent resin material, is installed in an opening of the indicator support hole 76 and seals the same.

The cap 78, for example, is installed so as to penetrate in an upward direction with respect to the upper surface of the bonnet 20. Owing thereto, the interior of the bonnet 20 is placed in a hermetically sealed state by the cap 78. The indicator support hole 76 is formed coaxially with the shaft hole 70 of the housing 16.

Additionally, the aforementioned body 14, the housing 16, and the bonnet 20 are connected together mutually by a plurality of non-illustrated connecting bolts.

The valve mechanism 18 includes a piston 56, which is accommodated in the piston chamber 64 formed in the large diameter part 50 of the housing 16, a shaft 80 connected to the center of the piston 56, a valve body (diaphragm valve) 82 connected to a lower end of the shaft 80, and a buffer ring (ring body) 84 installed between the shaft 80 and the valve body 82.

The piston 56 is formed in the shape of a disk and is disposed displaceably in the piston chamber 64 formed in the interior of the housing 16. A piston packing 86, which is disposed on an outer circumferential surface of the piston 56, slides in contact with an inner circumferential surface of the large diameter part 50. Further, a piston hole penetrates in the axial direction (the direction of arrows F and G) through the center of the piston 56, with one end of the shaft 80 being inserted therein. In addition, on the one end of the shaft 80, an adapter 88 is engaged therewith and connected to the piston 56, at a location that projects with respect to the upper surface of the piston 56.

Further, a spring-receiving member 90, which is recessed a predetermined depth in the axial direction (the direction of the arrow G), is formed on an upper surface of the piston 56. A pair of first and second springs (springs) 92, 94 is installed between the spring-receiving member 90 and the bonnet 20.

The first and second springs 92, 94 are constituted, for example, from coil springs. A small diameter first spring 92 is disposed on an inner circumferential side proximate the shaft 80, and a large diameter second spring 94 is disposed on an outer circumferential side with respect to the first spring 92. In addition, an elastic force of the first and second springs 92, 94 urges the piston 56 toward the side of the body 14, and more specifically, in a direction to press the piston 56 downward (in the direction of the arrow G).

Further, on one end of the shaft 80, an indicator 96 is connected coaxially through the adapter 88 at a location that projects with respect to the piston 56. The indicator 96 comprises a shaft having a predetermined length in the axial direction (the direction of arrows F and G), the shaft being supported displaceably in the indicator support hole 76 formed in the bonnet 20.

In addition, at least the upper end of the indicator 96 is colored in a color, for example, red or orange, which is easily visible from the exterior. By displacement of the piston 56 and the shaft 80 together in the axial direction (the direction of arrows F and G), and the upper end thereof being inserted into the interior of the cap 78, the indicator 96 can be confirmed visually from the exterior through the cap 78. Only a portion of the indicator 96 may be colored, or alternatively, the entirety of the indicator 96 may be colored as a whole.

The valve body 82 is constituted from a valve main body portion 100 made of a resilient material such as rubber or the like and including an axial member 98 connected to the shaft 80, and a skirt portion 102 formed as a thin film on an outer circumferential side of the main body portion 100. An outer edge 104 of the skirt portion 102 is sandwiched and gripped between the connector 42 of the body 14 and the small diameter part 48 of the housing 16.

Lips 106, which project in a downward direction (the direction of the arrow G) with respect to a lower surface that confronts the body 14, are formed in a central part of the main body portion 100, and on the upper surface of the main body portion 100 on the side of the housing 16, the axial member 98 is formed in a projecting manner and is connected to the shaft 80. The valve body 82 is connected to the lower end of the shaft 80 by screw-engagement of the axial member 98 with the lower end of the shaft 80.

As shown in FIG. 2B, inside the lips 106, a projection 108 is formed with a hemispherical shape in cross section, which projects a predetermined height in a downward direction (the direction of the arrow G) with respect to the lower surface of the main body portion 100. When the valve body 82 is displaced downward and is seated on the top portion 34 of the partition wall 30, the top portion 34 is inserted into the interior of the lips 106, and the projection 108 abuts against a distal end surface of the top portion 34.

As shown in FIG. 2C, the outer edge 104 of the skirt portion 102 is folded substantially perpendicularly with respect to the direction of extension of the skirt portion 102, and is formed with a pair of first annular protrusions (annular projections) 110 that project with respect to an outer circumferential surface of the skirt portion 102. Additionally, when the outer edge 104 is sandwiched between the connector 42 of the body 14 and the small diameter part 48 of the housing 16, the first annular protrusions 110 abut against an inner circumferential surface of the connector 42 and are deformed by being crushed therebetween. Consequently, the pair of first annular protrusions 110 can be made to abut reliably against the inner circumferential surface of the connector 42, and due to the outer edge 104, sealing performance can be enhanced between the body 14 and the housing 16.

Further, as shown in FIG. 2C, a second annular protrusion 112 projects in an upward direction (in the direction of the arrow F) of the connector 42 of the body 14 and abuts against a lower surface on the outer edge 104 of the skirt portion 102. The second annular protrusion 112 is provided to press against the outer edge 104 when the outer edge 104 is sandwiched between the connector 42 and the small diameter part 48.

The buffer ring 84 is disposed in the interior of the small diameter part 48 in the housing 16. A center portion of the buffer ring 84 is formed in a cylindrical shape, and the buffer ring 84 is formed to expand in diameter in a radial outward direction from the center portion. In addition, a lower end of the shaft 80 is inserted through the center portion of the buffer ring 84, and the buffer ring 84 is connected to the shaft 80 and the piston 56 by sandwiching the center portion of the buffer ring 84 between the main body portion 100 of the valve body 82 and a stepped portion of the shaft 80. Owing thereto, the buffer ring 84 is displaced integrally with the shaft 80 and the valve body 82.

Further, as shown in FIGS. 1 and 2C, a wear ring 114 is mounted through an annular groove on an outer circumferential surface of the buffer ring 84. The wear ring 114 slides in contact with the inner circumferential surface of the small diameter part 48, whereby the buffer ring 84 is guided with high precision along the axial direction (the direction of arrows F and G) when the buffer ring 84 is displaced in the interior of the housing 16.

On the other hand, the buffer ring 84 is formed to expand in a radial outward direction from the center portion. A portion of a lower surface of the buffer ring 84 is provided in abutment with the main body portion 100, and is disposed substantially in parallel with the skirt portion 102 of the valve body 82. In addition, a protective member (protective body) 116 made from a resilient material is disposed in a space formed between the buffer ring 84 and the skirt portion 102 of the valve body 82.

The protective member 116 is formed from a resilient material, for example, such as rubber or the like. By arranging the protective member 116 between the buffer ring 84 and an upper surface of the skirt portion 102, the protective member 116 is kept in intimate contact with the skirt portion 102, which is formed as a thin film. Therefore, in the event that the skirt portion 102 is flexed accompanying displacement of the valve body 82, the protective member 116 is deformed so as to follow the deformation of the skirt portion 102, whereby the skirt portion 102 can be protected.

In addition, by the lips 106 of the main body portion 100 being seated with respect to the top portion 34 of the partition wall 30, which is formed in the body 14, a valve-closed state is brought about in which communication between the first port 22 and the second port 24 is blocked. Conversely, upon separation of the main body portion 100 from the top portion 34, a valve-open state is brought about in which the first port 22 and the second port 24 are placed in communication through the first and second flow passages 26, 28.

The two-way valve 10 according to the embodiment of the present invention is constructed basically as described above. Next, operations and effects of the two-way valve 10 will be described. The condition shown in FIG. 1, i.e., a valve-closed state in which the valve body 82 is lowered, the lips 106 thereof are seated with respect to the top portion 34, and communication between the first flow passage 26 and the second flow passage 28 is blocked, will be described as an initial condition.

First, with the two-way valve 10 being in the initial condition shown in FIG. 1, as a result of the piston 56 being pressed downward (in the direction of the arrow G) by the elastic force of the first and second springs 92, 94, a valve-closed state is brought about, in which the valve body 82 is moved downward via the shaft 80 and the lips 106 abut against the top portion 34 of the partition wall 30. Therefore, the pressure fluid, which is supplied from the first port 22 to the first flow passage 26, is prevented from being supplied to the side of the second flow passage 28 by the partition wall 30 and the valve body 82. Moreover, such a case represents a condition in which pressure fluid is not supplied to the supply port 58.

Figure 3:
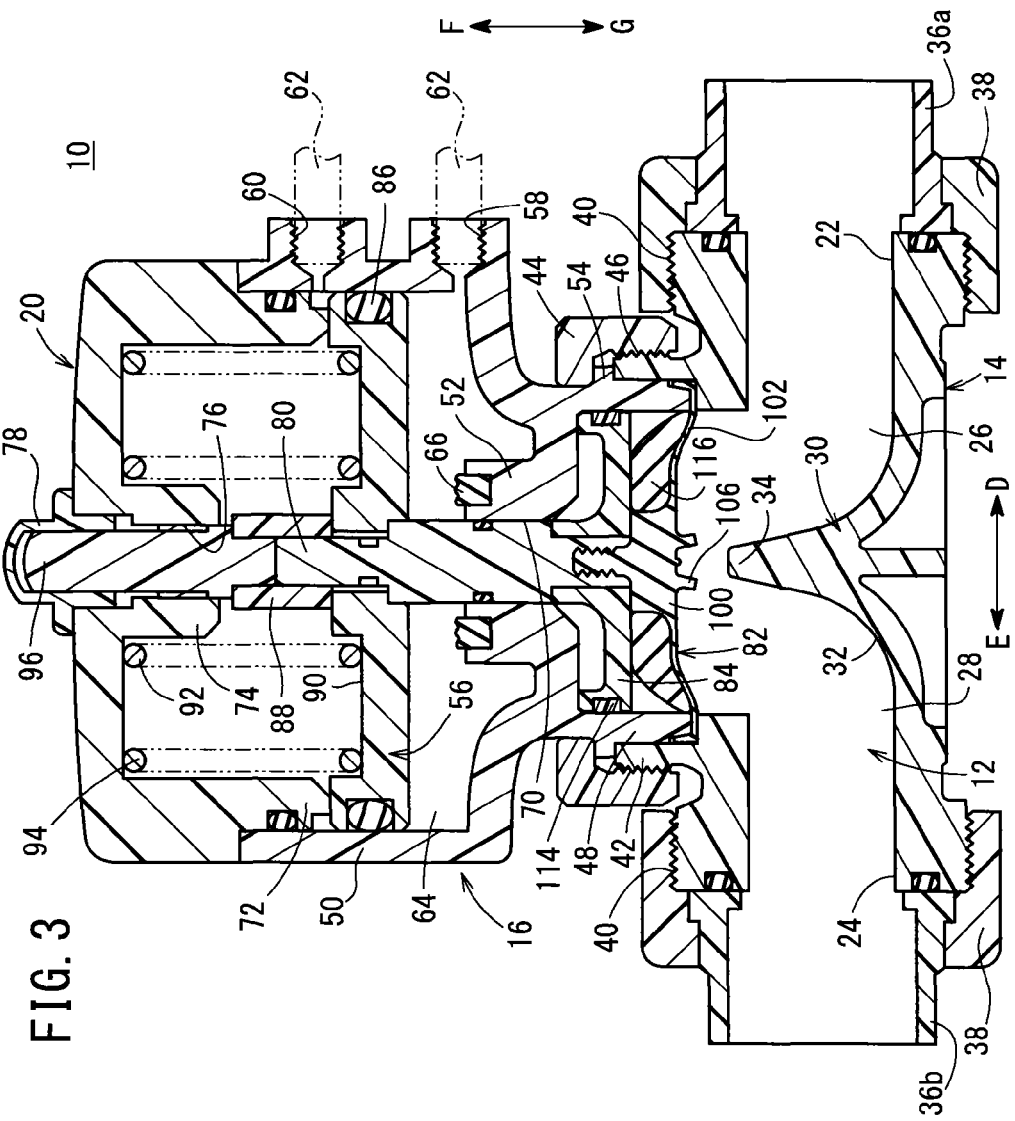
FIG. 3 is an overall cross sectional view showing a valve-open state in which a valve body is raised upward to enable communication between a first flow passage and a second flow passage in the two-way valve of FIG. 1.

Next, in the event that the two-way valve 10 is to be placed in a valve-open state, pressure fluid is supplied through the tube 62 from a non-illustrated pressure fluid supply source to the supply port 58, whereby the pressure fluid is supplied to the piston chamber 64 and the piston 56 is pressed upward (in the direction of the arrow F) in opposition to the elastic force of the first and second springs 92, 94. Consequently, the piston 56 is raised along the piston chamber 64, accompanied by the shaft 80, the indicator 96, and the valve body 82 being raised integrally in the axial direction (the direction of the arrow F). Thus, as shown in FIG. 3, the lips 106 of the valve body 82 separate away from the top portion 34 of the partition wall 30, and the communication-blocked state between the first flow passage 26 and the second flow passage 28 is released. As a result, the pressure fluid begins to flow from the first flow passage 26 to the second flow passage 28.

In addition, the piston 56 rises until the outer edge thereof comes into abutment with the lower end of the fitting 72 of the bonnet 20 and the piston 56 is stopped, whereupon the valve body 82 is placed in a valve-open state and is completely open. At this time, the indicator 96 rises and moves into the upper end of the cap 78. Owing thereto, the operator can visually confirm the indicator 96 from the exterior through the cap 78, whereby it can easily be confirmed that the valve has been placed in the completely open valve-open state.

In this case, the protective member 116 is deformed corresponding to the flexure of the skirt portion 102 accompanying rising of the valve body 82, and since the skirt portion 102, which is formed as a thin film, can be deformed while always being protected, durability of the skirt portion 102 can be improved.

Further, by stopping supply of the pressure fluid to the supply port 58, the upward pressing force applied with respect to the piston 56 is extinguished, and the piston 56 is pressed downward again (in the direction of the arrow G) by the elastic force of the first and second springs 92, 94, accompanied by the shaft 80, the indicator 96, and the valve body 82 being lowered integrally with the piston 56. In addition, by the piston 56 coming into abutment against the piston damper 66, lowering of the piston 56 is stopped, whereby generation of shocks and shock noises with respect to the piston 56 and the housing 16 is mitigated. At the same time, by seating of the lips 106 of the valve body 82 so as to cover the top portion 34 of the partition wall 30, a valve-closed state is brought about in which communication between the first flow passage 26 and the second flow passage 28 is blocked.

At this time, by the projection 108 formed in the interior of the lips 106 also coming into abutment against the distal end surface of the top portion 34, flow of the pressure fluid between the partition wall 30 and the valve body 82 is blocked not only by the lips 106 but also by the projection 108, and therefore, communication between the first flow passage 26 and the second flow passage 28 can be blocked more reliably.

Furthermore, since the downward thrust of the piston 56 can suitably be mitigated by abutment against the piston damper 66, shocks that occur when the valve body 82 is seated on the top portion 34 of the partition wall 30 are alleviated, and loads applied with respect to the valve body 82 are reduced. As a result, the valve body 82 can be used over a longer time period, and the exchange cycle for the valve body 82 can be prolonged.

In the foregoing manner, with the present embodiment, in the two-way valve 10, which is equipped with a diaphragm type valve body 82 having the main body portion 100, and the thin film skirt portion 102 that extends from the outer circumferential side of the main body portion 100, the lips 106 are provided on a lower part of the main body portion 100, the lips 106 abutting against the top portion 34 of the partition wall 30, which functions as a valve seat, in covering relation to the top portion 34. Consequently, compared to a conventional two-way valve in which sealing is performed by surface abutment between the valve body and the valve seat, sealing can reliably be performed with a small load at the time of valve closure. As a result, the pressing force at the time of valve closure when the valve body 82 is seated with respect to the valve seat, i.e., the elastic force of the first and second springs 92, 94, can be suppressed, and along therewith, the pressing force upon separation of the valve body 82 from the valve seat in opposition to the elastic force of the first and second springs 92, 94 can also be suppressed.

More specifically, the supplied amount of pressure fluid supplied to the first port 58 can be suppressed, together with allowing the first and second springs 92, 94 to be reduced in scale. Therefore costs and assembly man-hours for the two-way valve 10 can be reduced.

Further, the sealing performance by the lips 106 can be enhanced, along with prolonging the exchange cycle for the valve body 82. Therefore, the two-way valve 10 can have an increased service life.

Furthermore, the pair of first annular protrusions 110 is disposed on the outer edge 104 of the valve body 82, so that when the outer edge 104 is gripped between the body 14 and the housing 16, the first annular protrusions 110 abut against the connector 42 of the body 14 and are crushed and deformed thereby. Owing thereto, even in the event that the fastening force of connecting bolts (not shown), which mutually connect the body 14, the housing 16, and the bonnet 20, is decreased, the sealing performance of the first annular protrusions 110 between the housing 16 and the body 14 is reliably maintained, so that leakage of pressure fluid from between the body 14 and the housing 16 is prevented.

Still further, by providing the second annular protrusion 112 on the connector 42 of the body 14, which projects toward the side of the skirt portion 102 of the valve body 82, for example, even in the event that the fastening force of connecting bolts (not shown), which mutually connect the body 14, the housing 16, and the bonnet 20, is decreased, the sealing performance of the second annular protrusion 112 between the housing 16 and the body 14 is reliably maintained, so that leakage of pressure fluid from between the body 14 and the housing 16 is prevented.

Owing thereto, by providing the aforementioned first annular protrusions 110 and the second annular protrusion 112, sealing performance in the two-way valve 10 can be further enhanced, and as a result, the service life of the two-way valve 10 can be increased.

Still further, the annular wear ring 114 is installed on the outer circumferential surface of the buffer ring 84 that is provided integrally with the valve body 82, and by the wear ring 114 undergoing sliding contact with the inner circumferential surface of the small diameter part 48 of the housing 16, the wear ring 114 and the valve body 82 are guided highly precisely along the axial direction. As a result, since the lips 106, which are formed centrally on the valve body 82, can always be arranged in alignment with the top portion 34 of the partition wall 30, the lips 106 reliably seat on the top portion 34 to exhibit the sealing ability. Stated otherwise, via the wear ring 114, the buffer ring 84 is guided displaceably with high precision along the axial direction of the housing 16, whereby off-center misalignment of the shaft 80, which is connected to the buffer ring 84, can be prevented.

Further, the lips 106 are formed in a tapered shape in cross section, whereby the distance between the lips 106 gradually expands in width in a downward direction toward the side of the partition wall 30 that forms the valve seat, and therefore, when the lips 106 come into abutment with the top portion 34 of the partition wall 30, the lips 106 can be seated smoothly thereon.

Furthermore, since the indicator 96 is connected via the shaft 80 to the valve body 82, a valve-open state in which the valve body 82 is raised upward can easily and reliably be confirmed by an operator by viewing the upper end of the indicator 96 from the exterior of the two-way valve 10 through the cap 78.

Still further, since the valve body 82 is arranged coaxially with the small diameter part 48 of the housing 16 through the buffer ring 84, merely by fitting and assembling the small diameter part 48 with the connector 42 of the body 14, the valve body 82, and the partition wall 30 can be arranged on a straight line. More specifically, by a simple operation of assembling the housing 16 with respect to the body 14, the valve body 82, the shaft 80, and the piston 56 can reliably be arranged concentrically and in proper alignment with the partition wall 30. Therefore, upon lowering and seating of the valve body 82 onto the partition wall 30, the lips 106 can be reliably seated and made to cover the top portion 34 of the partition wall 30.

The two-way valve system according to the present invention is not limited to the above embodiment. Various changes and modifications may be made to the embodiment without departing from the scope of the invention as set forth in the appended claims.

What is claimed is:

1. A two-way valve comprising:
   a body including a pair of first and second ports through which a pressure fluid is supplied and discharged, flow passages connected to the first port and the second port;
   a partition member formed midway in the flow passages and separating the first port and the second port;
   a diaphragm valve having a main body portion disposed displaceably in the body and which is seated on a valve seat formed on an end of the partition member, wherein communication between the flow passages is interrupted by seating of the main body portion on the valve seat;
   a skirt portion formed as a thin film on an outer circumferential side of the main body portion and which is retained by the body, an outer edge of the skirt portion projects perpendicularly with respect to a direction of extension of the skirt portion; and
   a protective body made of a resilient member, which alleviates a load applied to the skirt portion by being disposed in intimate contact with the skirt portion, wherein the diaphragm valve is connected to one end of a shaft disposed displaceably in an axial direction, and a spring that urges the diaphragm valve toward the valve seat is disposed on a piston connected to another end of the shaft, and the main body portion includes, on a bottom portion thereof facing the valve seat, a first lip and a second lip that each abut against and cover a different respective side surface of the partition member when seated on the valve seat, wherein the skirt portion includes annular projections which project outwardly from an outer circumferential side surface of the outer edge of the skirt portion, the annular projections project in a direction of the flow passages and are configured to abut against the body, wherein the body includes an annular protrusion projecting in a direction perpendicular to the flow passages and configured to abut against the skirt portion as a position spaced apart from the outer edge of the skirt portion.

2. The two-way valve according to claim 1, wherein a projection that projects toward a side of the valve seat is formed between the first and second lips, the projection abutting against the valve seat when seated on the valve seat.

3. The two-way valve according to claim 1, wherein the body comprises a positioning mechanism for stopping the piston at a predetermined position, in a valve-closed state when the diaphragm valve is seated on the valve seat.

4. The two-way valve according to claim 3, wherein the positioning mechanism comprises an annular damper formed from a resilient member.

5. The two-way valve according to claim 1, wherein a ring body that covers the protective body is disposed on the diaphragm valve, and a wear ring, which is in sliding contact with an inner circumferential surface of a housing that is connected to the body, is disposed on an outer circumferential surface of the ring body, the ring body being displaceable via the wear ring in an axial direction.

6. The two-way valve according to claim 5, wherein the housing is connected in fitting engagement with respect to the body, such that the diaphragm valve and the shaft are arranged concentrically in alignment with the valve seat.

7. The two-way valve according to claim 1, wherein an indicator that enables visualization of open and closed states of the diaphragm valve is disposed on a distal end of the shaft.

8. The two-way valve according to claim 1, wherein the partitioning member projects from inner wall surfaces of the flow passages, and is formed with a mountain shape in cross section having the valve seat on a top portion thereof.

* * * * *